United States Patent [19]

Li

[11] 4,086,725
[45] May 2, 1978

[54] METHOD AND APPARATUS FOR GROWING PLANT SPROUTS

[76] Inventor: Tsiang Kwang Li, 66 Lakewood Ave., Ho-Ho-Kus, N.J. 07423

[21] Appl. No.: 699,878

[22] Filed: Jun. 25, 1976

[51] Int. Cl.² .......................................... A01G 31/00
[52] U.S. Cl. ............................................ 47/61; 47/14
[58] Field of Search .................................. 47/59–61, 47/14–16, 58

[56] References Cited

U.S. PATENT DOCUMENTS

| 2,750,713 | 6/1956 | Chin | 47/14 |
| 2,810,988 | 10/1957 | Chin | 47/14 |
| 3,141,263 | 7/1964 | Wang | 47/14 |
| 3,768,201 | 10/1973 | Yoo | 47/16 |
| 3,945,148 | 3/1976 | Oyama | 47/14 |

FOREIGN PATENT DOCUMENTS

| 1,141,377 | 9/1957 | France | 47/60 |

OTHER PUBLICATIONS

House Beautiful, May, 1959, pp. 180, 192 relied on.

Primary Examiner—Robert E. Bagwill
Attorney, Agent, or Firm—Coleman R. Reap

[57] ABSTRACT

Apparatus for sprouting plant seeds and growing the sprouts to a desired size is disclosed comprising a container having an open top and perforated bottom and side wall, a flexible screen means adapted to upwardly extend the horizontal restraint of the sidewall on the sprouts and, optionally, a heat reflective gas and moisture impermeable means adapted to surround and cover the top and side wall of the container. An improved method of growing plant sprouts is disclosed which comprises growing the sprouted plants in the above described container with the flexible screen means arranged to exert a constant pressure radially inward against the growing sprouts. In a preferred embodiment the open top of the container is covered by the flexible screen means and the screen-covered container is covered with the heat reflective means.

29 Claims, 8 Drawing Figures

METHOD AND APPARATUS FOR GROWING PLANT SPROUTS

BACKGROUND OF THE INVENTION

This invention relates to the soilless growth of plant sprouts and more particularly to a method and apparatus for growing superior quality plant sprouts.

Plant sprouts are commonly grown for human and animal consumption by subjecting them to controlled conditions of temperature, light and humidity. They are usually grown in a soilless indoor environment with external temperature control in enclosed containers having means for drainage in which they are periodically watered. Their acceptance as a food for humans is influenced by their appearance and taste. Commercially grown sprouts are often long and thin and have curled and discolored root portions and sometimes have an undesirable taste. Plant sprouts grown by conventional procedures usually require about 5 or more days of growth before they are ready for harvesting. Improvements in the methods and apparatus employed for growing plant sprouts which would enable growers to produce superior quality plant sprouts in shorter periods of time are continuously sought.

SUMMARY OF THE INVENTION

Apparatus and procedures have now been developed which make it possible to grow superior quality plant sprouts in shorter periods of time indoors or outdoors with or without environmental control. Accordingly, it is an object of the invention to present apparatus for growing plant sprouts. It is another object of the invention to present apparatus for growing superior quality plant sprouts. It is another object of the invention to present apparatus which enables growers to produce superior quality plant sprouts in shorter periods of time. It is another object of the invention to present apparatus in which bean sprouts having improved flavor, texture and appearance can be grown in shorter periods of time. It is another object of the invention to present an improved method of growing plant sprouts. It is another object of the invention to present an improved method of growing plant sprouts of superior quality. It is another object of the invention to present a method of growing plant sprouts in shorter periods of time. It is another object of the invention to present a method of growing plant sprouts of superior quality in shorter periods of time. It is another object of the invention to present a method of growing plant sprouts of superior quality independent of the temperature or humidity of the environment. It is another object of the invention to present a method of growing bean sprouts having superior flavor, texture and appearance in shorter periods of time.

These and other objects of the invention will become more apparent from the description and drawings in which.

DETAILED DESCRIPTION OF THE INVENTION

Figure 1:
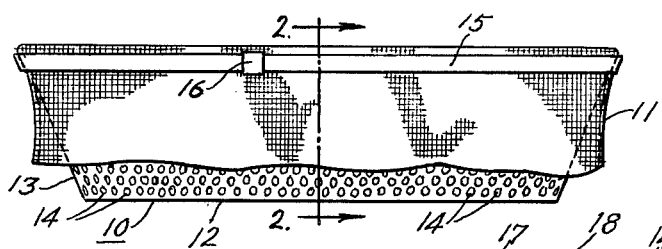
FIG. 1 is a side elevation of a perforated open top container with a flexible screen arranged to partially cover the open top of the container.

Considering the drawings in more detail FIGS. 1 to 4 show one form of the apparatus used for sprouting plant seeds, including grains, and growing the plant sprouts to maturity in accordance with the invention. The apparatus in this embodiment is comprised of a container 10 having an open top and means 11 for controlling the radially outward movement of the mass of growing plant sprouts, means 11 being shown in these figures as flexible screening. Flexible screening 11 extends around the top edge of container 10 and may extend partially or fully over the open top of container 10. Container 10 has a bottom wall 12 and at least one sidewall 13, both of which preferably have perforations 14.

Container 10 may be made of any substantially rigid material and is preferably constructed of light, rustproof and water resistant material such as aluminum, stainless steel, or plastic. Sidewall 13 is preferably strong enough to contain the plant seeds without external support. Container 10 may have any given shape but it is preferred that it be substantially circular in cross section, i.e., cylindrical, oval shaped or frustroconical with the open top forming one end of the cylinder or oval or the base of the truncated cone. One or more rigid members 22 may extend longitudinally from the sidewall of container 10, if desired to provide support for the radial expansion limiting means.

Figure 2:
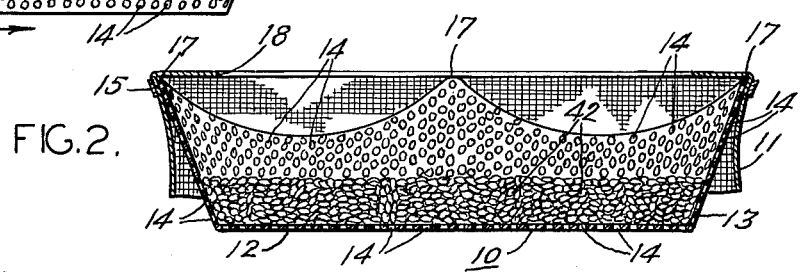
FIG. 2 is a sectional view of the apparatus illustrated in FIG. 1 taken along line 2—2 of FIG. 1 showing unsprouted plant seeds in the container.
Figure 3:
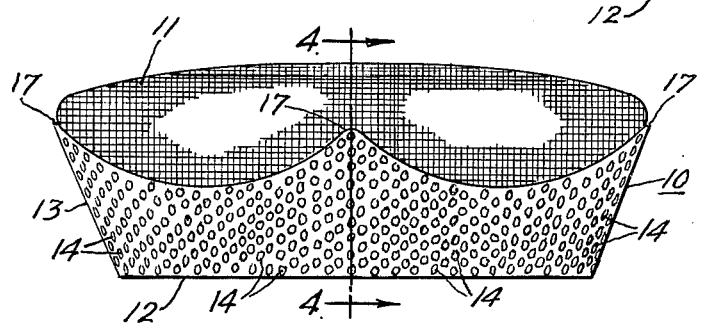
FIG. 3 is a side elevation of a perforated container containing growing plants sprouts in an early stage of growth, the open top of the container being covered with flexible screening.
Figure 5:
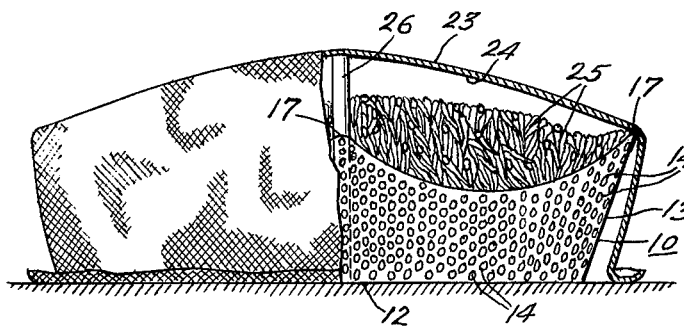
FIG. 5 is side elevation, partly in section of a perforated open top container with growing sprouts surrounded by a heat reflective cover.
Figure 7:
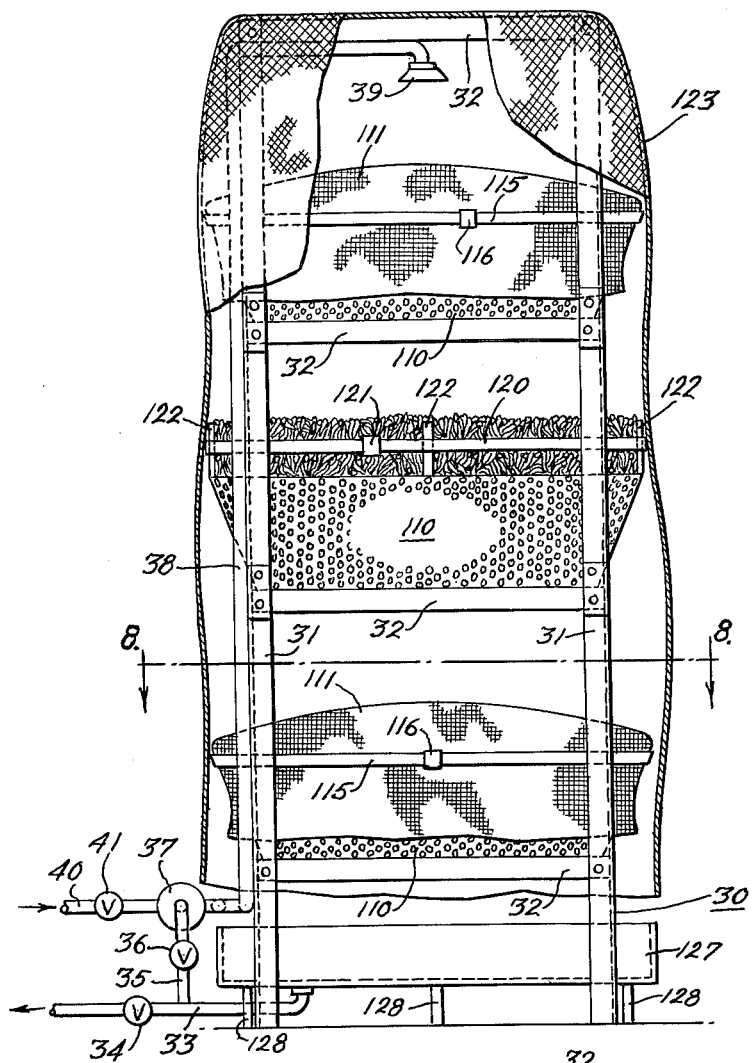
FIG. 7 is a side elevational view, partly cut away, of another embodiment of the invention showing multiple containers arranged vertically.

The top edge of the container may be flat, as shown in FIG. 7, or it may be crown-shaped, as shown in FIGS. 2, 3 and 5.

Figure 4:
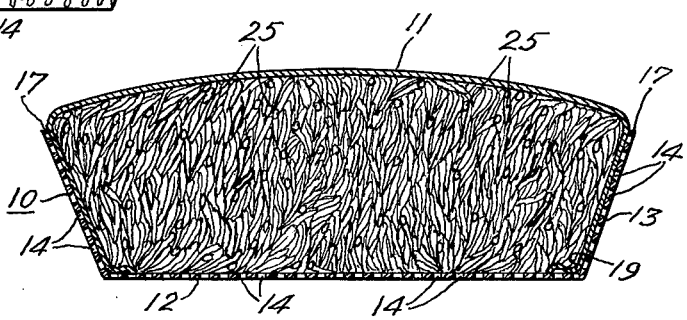
FIG. 4 is a sectional view of the apparatus illustrated in FIG. 3 taken along the line 4—4 of FIG. 3.
Figure 6:
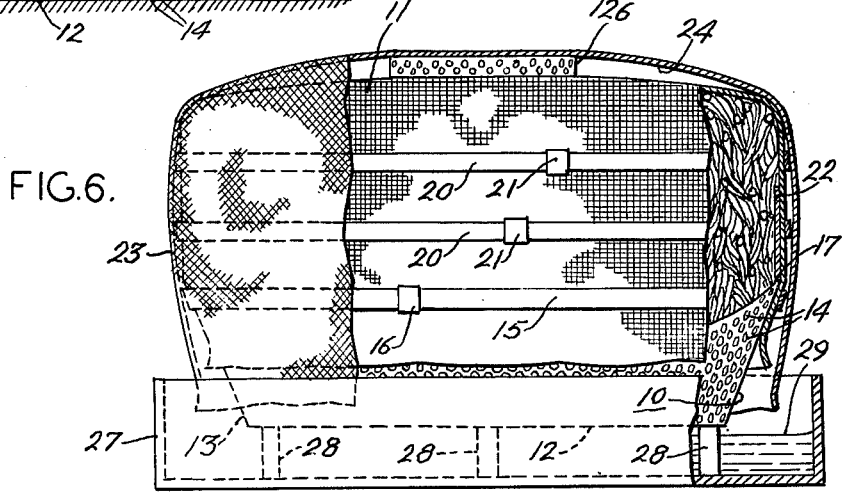
FIG. 6 illustrates the apparatus of FIG. 1 containing plant sprouts in a later stage of growth, the apparatus having multiple means for restricting the sideward expansion of the mass of plant sprouts and being placed in a water collecting pan and covered with a heat reflective mantle.

Flexible screening 11 may be made of any material, preferably a limp material, which readily permits the passage of water, such as fine aluminum or nylon screening or cloth but it is preferably made from moisture-absorbent fibrous material which can be easily stretched, such as fine mesh, gauze or cheesecloth. Flexible screening 11 is preferably arranged about the open top of container 10 in such a manner that it functions as an extension of sidewall 13 of the container. To perform this function flexible screening 11 can be positioned around the outside of sidewall 13 of container as shown in FIGS. 1 and 2 or inside of sidewall 13 and held in contiguous relationship with the sidewall as shown in FIGS. 3 and 4. This may be accomplished by any desired means, eg., its edge may be held in place against sidewall 13 by fastening means 15 provided with adjustment means 16 which, for example, may be a buckle, or it may be tucked between sidewall 13 and the seeds which are placed in container 10 for sprouting and held in place by the weight of the seeds or the growing sprouts. In FIG. 2 fastening means 15 is shown held against upwardly extending portions 17 of sidewall 13, but the top edge of sidewall 13 can be flat as shown on container 110 of FIG. 7, in which case fastening means 15 can be conveniently held in place against the upper portion of sidewall 13 or against vertical support members, as shown in FIG. 7. Fastening means 15 can also be held in place by vertical support members 22 fastened to sidewall 13 as shown in FIG. 6.

The shape of flexible screening 11 is not critical and, in general, its shape will depend upon the embodiment of the invention used to grow plant sprouts. In the embodiment illustrated in FIG. 1 flexible screening 11 does not completely cover the open top of container 10. In this embodiment the center of the open top of container 10 can be left open, e.g., to form an annulus, or covered, if desired, by an additional piece of flexible screening or other material. For this embodiment flexible screening 11 can be cut from a large continuous piece of material having a rectangular, circular or other desired shape. The opening 18 of screening 11 can be formed by cutting out the portion of the material which will lay over the open top of container 10 when the screening is positioned over the container. Flexible screening 11 can also be cut in the shape of a long rectangular strip of material which can be arranged around the top edge of container 10 in such a fashion that the central area of the open top of the container is uncovered.

In the embodiment illustrated in FIG. 3 the flexible screening covers the entire open top of container 10. The flexible screening used in this embodiment can be made of one continuous piece of material or it can be made from two or more pieces of screening material cut in any desired shape.

Any one of the foregoing designs or others, not illustrated, can be employed in the fabrication and arrangement of the flexible screening used in the apparatus of the invention. It is important, however, that the radial dimension of the flexible screening be great enough to provide for the maximum adjustment for the greatest height desired in the growing of the sprouts. As can be seen in FIGS. 1 and 4 there is usually provided a considerable excess of flexible screening material to allow for adjustment during the plant sprout growing period.

When flexible screening 11 is tucked between the sprouting seeds and sidewall 13 as shown in FIGS. 3 and 4, all of the excess material 19 may be tucked in or enough of it may be tucked in to firmly hold the screening in place and the excess permitted to extend over sidewall 13 of container 10. The final height that the sprouts reach will depend upon both the amount of seeds placed in container 10 and, as is explained below, the lateral expansion permitted the sprouts during their growth.

One of the principal functions of element 11 is to serve as a means for controlling the radial and vertical expansion of the growing mass of sprouts, that is, as a flexible circumference adjustment means. It also serves to control the radial expansion of the mass of sprouts. Although element 11 is described as flexible screening this function can be served by any equivalent means. For example, any means such as restraining means 120 with adjustment means 121 shown in FIG. 7 can be used alone to restrict the radial expansion of the sprouts. Restraining means 120 can be held in place by vertical support members 122 which are fastened to container 110 as shown in FIG. 7 or it may be held in place by the upward extensions 17 of sidewall 13 shown on container 10 in FIGS. 1 to 6. Element 11 is described as screening since screening can be very effectively used to gently apply a widely distributed restraining force against the sprouts. Screening has the added advantage of easily transmitting moisture.

When a fastening means is used to hold flexible screening 11 in place any suitable fastening means 15 may be used, such as rope, wire, snaps, adjustable belt, or any other means which will suitably hold flexible screening 11 in place around the upper portion of container 10. It is convenient to employ a fastening means which will permit easy adjustment of flexible screen 11 or permit removal of the screening for watering, inspection, etc.

In a further embodiment of the invention the entire upper portion of container 10 is covered with a mantle 23 of heat reflective, preferably moisture and vapor impermeable material, as shown in FIG. 5. Mantle 23 has at least one heat reflective surface 24 and is preferably of thin cross-section. Mantle 23 may be constructed of any material which has a highly reflective surface, such as metal foil, high molecular weight polymers, spun glass fibers, natural or synthetic fabrics, combinations of any of these, etc., but it is preferably made of a flexible material which can be easily adjusted in size and shape to provide the desired snug fit around and over container 10. Mantle 23 serves the purpose of reflecting heat given off by the growing sprouts back to the mass of sprouts, thereby facilitating the maintenance of a suitable temperature for plant growth and eliminating the need for using external heat to grow the plant sprouts even in cold environments such as is encountered in northern regions in wintertime. An additional benefit derived when mantle 23 is snugly wrapped around the sidewall of container 10 is that there is little or no circulation of air around the container. In other words, warm gases arising from the central portion of container 10 are forced to pass downwardly through the outer cooler regions of the bed of sprouts, thereby warming up the sprouts in this region so that the teperature variation across the entire bed is kept to a minimum. Mantle 23 is also preferably moisture and vapor impermeable so that the efflux of gases, such as carbon dioxide, from the bed of sprouts is minimized with the result that superior quality sprouts are produced. Mantle 23 is also preferably lightproof.

In the embodiment illustrated in FIG. 5 no radial expansion means is shown. In this embodiment the sprouts 25 are permitted to grow without restriction. However a screen means or other radial expansion limiting means may be used in combination with the heat reflective mantle as shown in FIGS. 6 and 7. In FIG. 5 the mantle is shown being held above the sprout bed by a rigid member 26.

FIG. 6 illustrates an additional feature of the invention. In this embodiment one or more additional plant sprout bed radial expansion limiting means 20 are shown disposed around flexible screen means 11 at various elevations. Each expansion limiting means may be provided with a buckle 21 or other suitable adjustment means for controlling the girth of the mass of growing plant sprouts. The additional radial expansion limiting means may be made of any desired material, such as rope, belt, elastic, etc. Screen fastening means 15 may be made from the same or different material as radial expansion limiting means 20 or 120.

As explained above, a principal purpose of flexible screening 11 is to control the radial expansion of the growing sprouts and this may be accomplished by means of one or more restraining means 20 used alone or used in combination with flexible screening 11. Furthermore, the additional restraining means may be either inside of or outside of the heat reflective mantle, although it is usually preferred that they be applied directly to the flexible screening.

In FIG. 6 container 10 is shown placed above a water collecting pan 27. Legs 28 permit container 10 to be positioned above the water level 29 in collecting pan 27 to provide for proper drainage of the liquid in container 10. It is often advantageous to pass the aqueous liquid used in watering the sprouts over the sprouts several times during each watering. Thus, the aqueous liquid collected in pan 27 can be repeatedly poured over the sprouts during each watering period. The flexible screen covered container shown in FIG. 6 is covered with a heat reflective mantle 23. The mantle is shown held above the top of the flexible screening by a spacer 126 having sufficient rigidity to support the screening to provide a headspace between the screening and the mantle.

FIG. 7 illustrates an embodiment in which the apparatus of the invention is used in a space-saving vertical arrangement. In FIG. 7 several perforated containers 110 are shown stacked in frame 30 which may be constructed in any desired form but, for convenience, is illustrated in FIG. 7 as being made from several vertical members 31 held in parallel relationship by cross members 32. The cross members 32 are arranged to form rectangular spaces in horizontal planes, each rectangle being adapted to receive and support a container 110 in fixed relationship. A large mantle 123 similar in construction to mantle 23 shown in FIGS. 5 and 6 is positioned around and over frame 30. In FIG. 7 the radial expansion of the sprouts is controlled in the upper and lower containers by means of flexible screen means 111 and fastening means 115 with adjustment means 116 and the expansion of the sprouts in the center container is controlled solely by restraining means 120 with adjustment means 121. A drain pan 127 is supported on legs 128 and positioned beneath the lowermost container on frame 30. Pan 127 is provided with a drain pipe 33 which can be connected to a sewer by opening valve 34. A pipe 35, connected to pipe 33 and provided with a valve 36 is connected to the suction end of a pump 37. The discharge end of pump 37 is connected to pipe 38 which communicates with spray means 39. Pipe 40, fitted with valve 41 supplies fresh water to pipe 38.

Figure 8:
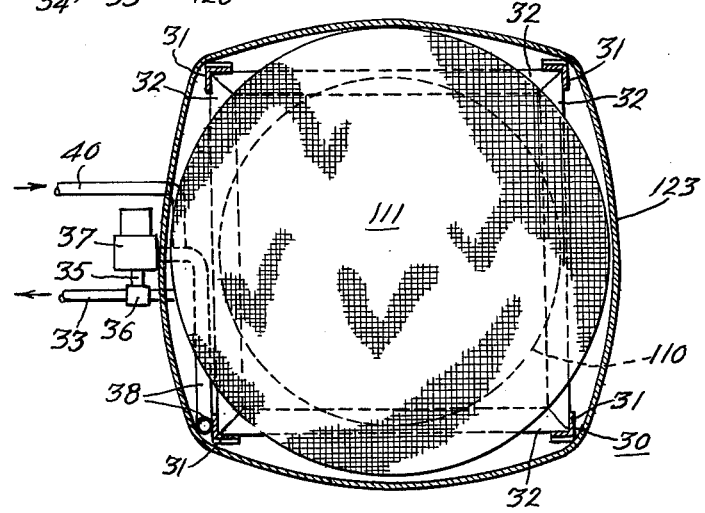
FIG. 8 is a sectional view taken along line 8—8 of FIG. 7.

FIG. 8 shows a preferred arrangement in which the diagonal dimension of frame 30 is slightly greater than the diameter of containers 110. The vertical portion of pipe 38 is also shown adjacent to vertical member 31. This arrangement permits heat reflective mantle 123 to be in close proximity to containers 110. When a container of the type illustrated in FIGS. 1 to 6 is used in the apparatus of FIGS. 7 and 8 a very close arrangement of the mantle to the container is permitted when the container is arranged such that the portions 17 are disposed midway between vertical members 31 since the container radius is greatest from the center of the container to the portions where the sidewall of the container is highest. In such case the horizontal diagonal dimension of frame 30 will be less than the largest diameter of the container.

Although the process of the invention can be practiced using any plant seeds it is preferred to use the seeds of vegetables and grains, as their sprouts are more acceptable for human consumption. Preferred vegetable seeds are beans, particularly mung, lentil and soy beans and preferred grain seeds, usually referred to simply as grains, are alfalfa, wheat and corn. For convenience the process of the invention will be described as it is practiced using beans.

In accordance with one preferred embodiment of the invention beans are soaked in water or other desirable aqueous media for about 8 hours, preferably in darkness. The soaked beans 42 are placed in perforated containers such as containers 10, usually to a depth of about 2 to 6, and preferably to a depth of about 3 to 4, inches. The containers can have any desired dimensions but are preferably about 2 to 6 inches high and preferably have maximum major dimensions of about 4 feet. It is often preferred to use containers which are circular or substantially circular, including oval-shaped, in cross section, since sprouts growing in a bed tend to expand laterally in a radially outward direction, and it is easier to control the circumference of a circular bed. However container 10 may have any desired shape, including rectangular, and the term radial expansion is intended to include any lateral expansion of the bed. After the beans are placed in the container, they are preferably covered with a gauze-like material. When the sprouts begin to grow a radial expansion limiting means, such as restraining means 120 or flexible screening 11, is positioned about the open top of the container. When screening is used it preferably completely closes the open top of the container. The flexible screening can be fastened to the top edge of the container by a suitable fastening means such as means 15 or it can be tucked between the beans and the container. The flexible screening 11 can rest gently on the top surface of the beans. The beans and the resulting growing sprouts are watered intermittently several times a day, for example, every 5 hours, until they are ready for harvesting. This can be accomplished by sprinkling water over the top of the beans or sprouts and, when desired, repouring the water collected in pan 27 over the sprouts to the desired extent.

In accordance with another preferred embodiment of the invention, bean sprouts are grown in a perforated container which is placed in a mantle, preferably flexible, having a heat reflective surface. The mantle is arranged so that the heat reflective surface faces the perforated container as shown in FIG. 5. The use of the heat reflective mantle markedly reduces the time required for the sprouts to reach a desired degree of maturity. The quality of the sprouts is also improved by using a heat reflective mantle which is both moisture and vapor impermeable and lightproof. Further improvement in the quality of the sprouts is realized when the heat reflective mantle is drawn snugly around the perforated container during the sprout growing period.

In accordance with another preferred embodiment of the invention, the sprout radial expansion limiting means, eg., restraining means 20 or flexible screening 11, with or without additional restraining means, is used with the perforated container and the perforated container is kept within the heat reflective mantle during the sprout growing period. In this embodiment, illustrated in FIG. 6, the benefit of both the lateral expansion limiting means and the heat reflective mantle are realized and sprouts of improved quality can be grown to maturity in shorter periods of time.

When growing sprouts for human consumption it is preferable to grow the sprouts in the absence of light, as light tends to promote the growth of leaf structure and pigmentation on the sprouts. The presence of leaves is not usually desired in sprouts intended for human consumption, as they may undesirably alter the flavor of the sprouts. Furthermore, sprouts which are unpigmented are usually more desirable for human consumption.

The process of the invention may be practiced in the apparatus illustrated in FIG. 7 in the same manner described above, however, the watering and water recirculation may be accomplished without removing the heat reflective mantle 123. When it is desired to water and growing plant sprouts in the apparatus of FIG. 7 fresh water can be supplied from pipe 40 by opening valve 41, thereby admitting the water to pipe 38. The water is sprayed over the surface of the top container through spray means 39 which is connected to pipe 38. When the desired amount of fresh water is introduced into the apparatus shown in FIG. 7, valve 41 is closed. The water collected in pan 127 can be re-sprayed over the containers by opening valve 36 and starting pump 37. When the desired amount of water recirculation has been accomplished, pump 37 can be shut off and valve 36 can be closed. If desired, additional recirculation of the water in pan 127 can be effected at any time. when it is desired to discard the water in pan 127, valve 34 is opened thereby permitting the water in pan 127 to flow to the sewer.

The quality of the bean sprouts is influenced by the rate of gas diffusion through the bed of sprouts. The rate of gas diffusion through the bed is, of course, dependent upon the amount of void space in the sprout bed. The amount of void space can be conveniently regulated by controlling the freedom of lateral and vertical expansion of the bed. Thus the quality of plant sprout product can be controlled by careful control of the radial expansion of the sprout bed. If long, less succulent sprouts are desired the sprouts are permitted to grow with little or no restriction of the void space in the bed of sprouts. If, however, fat, succulent sprouts are desired the amount of void space in the bed of sprouts is reduced or limited by any suitable means such as by the use of the apparatus described above.

Although the invention has been described with particular reference to specific details, the breadth of the invention is not limited to such details but is limited only by the scope of the appended claim.

I claim:

1. Apparatus for growing plant sprouts comprising (1) a container having an open top, a sidewall and a perforated bottom, and (2) flexible means held in contiguous relationship with said sidewall and providing a longitudinal extension thereof and being adapted to restrain expansion of the plant sprouts during the plant sprout growing period, said means being adjustable to permit the restraint on the sprouts to be varied.

2. The apparatus of claim 1 wherein the expansion restraining means is made of flexible screening.

3. Apparatus for growing plant sprouts (1) a container having an open top, a perforated bottom, and a sidewall, and (2) a flexible mantle having a heat reflective surface disposed around and over the container in snug relationship with the container with the heat reflective surface facing the container.

4. Apparatus for growing plant sprouts comprising (1) a container having an open top, a sidewall and a perforated bottom, and (2) flexible screen means held in contiguous relationship with said sidewall and extending at least partly over said open top, said flexible screen means being adapted to provide a longitudinal extension of said sidewall.

5. The apparatus of claim 4 wherein said flexible screen means forms an annulus over the open top of the container.

6. The apparatus of claim 4 wherein said flexible screen means completely covers the open top of the container.

7. The apparatus of claim 4 wherein at least one adjustable restraining means is disposed concentrically around said flexible screen means at a position longitudinally displaced from said sidewall.

8. The apparatus of claim 4 wherein said flexible screen means is held in contiguous relationship with said sidewall by restraining means disposed concentrically around said flexible screen means.

9. The apparatus of claim 4 disposed within a mantle having a heat reflective surface, said heat reflective surface facing said container.

10. Apparatus for growing plant sprouts comprising
  (a) a container having an open top, a perforated bottom and a sidewall,
  (b) an adjustable flexible screen means disposed about the open top of said container, a portion of said screen means being held in continuous, contiguous relationship with said sidewall, and
  (c) a flexible mantle having a heat reflective surface disposed to surround and cover said container, said heat reflective surface facing said container.

11. The apparatus of claim 10 wherein said flexible mantle is moisture and vapor impermeable and lightproof.

12. The apparatus of claim 10 wherein said container is substantially circular in cross-section.

13. In a method of growing plant sprouts by soaking plant seeds with an aqueous medium to effect sprouting of the seeds and growing the sprouts with intermittent watering in a perforated container having an open top, the amount of sprouts being grown in said perforated container being such that the volume of the sprouts will exceed the volume of the container during the growing period, the improvement comprising limiting, during the growing period, the expansion of those sprouts which have outgrown the confines of the perforated container.

14. The improved method of claim 13 wherein the expansion of the sprouts is controlled by circumscribing the growing sprouts with a flexible, adjustable restraining means.

15. The improved method of claim 14 wherein said restraining means includes a flexible screen means.

16. The improved method of claim 15 wherein said flexible screen means is a soft gauzelike material.

17. The improved method of claim 15 wherein said flexible screen means completely covers the open top of the container.

18. The improved method of claim 15 wherein at least one additional adjustable restraining means is disposed around the growing sprouts in a position longitudinally displaced from said sidewall.

19. In a method of growing plant sprouts by soaking plant seeds with an aqueous medium to effect sprouting of the seeds and growing the sprouts with intermittent watering in a perforated container having an open top, the improvement comprising placing the perforated container inside a flexible mantle having a heat reflective surface during the sprout growing period, the mantle being arranged so that the heat reflective surface faces the perforated container.

20. The improved method of claim 19 wherein the mantle is light proof.

21. The improved method of claim 19 wherein the mantle is moisture and vapor impermeable.

22. The improved method of claim 19 wherein the mantle is drawn snugly around the sidewall of the perforated container.

23. In a method for growing plant sprouts by soaking plant seeds with an aqueous medium to effect sprouting of the seeds and growing the sprouts with intermittent watering in a perforated container having an open top, the improvement comprising placing, during the sprout growing period, the perforated container within a flexible mantle the inside surface of which is covered with a heat reflective material, and controlling the expansion of the growing sprouts by surrounding them with at least one adjustable expansion restraining means.

24. The improved method of claim 23 wherein the expansion restraining means is positioned inside of the flexible mantle.

25. The improved method of claim 24 wherein the water used in watering the sprouts is recirculated over the sprouts at least once during each watering period.

26. The improved method of claim 23 wherein the plant sprouts are grown in two or more perforated containers arranged in vertical order within the flexible heat-reflective mantle, each perforated container having its own expansion restraining means.

27. The improved method of claim 23 wherein the plant sprouts are bean sprouts.

28. In a method of growing plant sprouts by soaking plant seeds with an aqueous medium to effect sprouting of the seeds and growing the sprouts with intermittent watering in a perforated container having an open top, the improvement comprising, during the sprout growing period, keeping the growing sprouts covered with flexible screening adapted to restrict the expansion of the sprouts and maintain a continuous force thereagainst, and keeping the container with the flexible screening-covered sprouts snugly wrapped in a flexible mantle having a heat reflective surface facing the container.

29. The method of claim 28 wherein the girth and height of the flexible screening are periodically adjusted to maintain said containuous force of the desired magnitude against the lant sprouts during the growing period.

* * * * *